United States Patent
Fisher

(10) Patent No.: US 9,236,758 B2
(45) Date of Patent: Jan. 12, 2016

(54) SYSTEM AND METHOD TO ALIGN A SOURCE RESONATOR AND A CAPTURE RESONATOR FOR WIRELESS ELECTRICAL POWER TRANSFER

(71) Applicant: DELPHI TECHNOLOGIES, INC., Troy, MI (US)

(72) Inventor: Scott F. Fisher, Niles, OH (US)

(73) Assignee: Delphi Technologies, Inc., Troy, MI (US)

(*) Notice: Subject to any disclaimer, the term of this patent is extended or adjusted under 35 U.S.C. 154(b) by 505 days.

(21) Appl. No.: 13/677,369

(22) Filed: Nov. 15, 2012

(65) Prior Publication Data

US 2014/0132208 A1 May 15, 2014

(51) Int. Cl.
*H02J 7/02* (2006.01)
*H02J 5/00* (2006.01)

(52) U.S. Cl.
CPC .............. *H02J 7/025* (2013.01); *H02J 5/005* (2013.01)

(58) Field of Classification Search
CPC .................................................... B60L 11/182
USPC ........................................................ 320/108
See application file for complete search history.

(56) References Cited

U.S. PATENT DOCUMENTS

| | | | |
|---|---|---|---|
| 5,406,395 A | 4/1995 | Wilson et al. | |
| 5,498,948 A | 3/1996 | Bruni et al. | |
| 6,720,921 B2 | 4/2004 | Ripingill, Jr. et al. | |
| 7,573,402 B2 | 8/2009 | Herbert et al. | |
| 8,008,888 B2 | 8/2011 | Oyobe et al. | |
| 2002/0140576 A1 | 10/2002 | Simon | |
| 2007/0126395 A1 | 6/2007 | Suchar | |
| 2007/0131505 A1 | 6/2007 | Kim | |
| 2010/0161216 A1* | 6/2010 | Yamamoto | 701/207 |
| 2011/0181240 A1 | 7/2011 | Baarman et al. | |
| 2011/0254503 A1* | 10/2011 | Widmer et al. | 320/108 |
| 2011/0301795 A1* | 12/2011 | Failing | 701/22 |
| 2012/0091959 A1* | 4/2012 | Martin et al. | 320/109 |
| 2012/0095617 A1* | 4/2012 | Martin | 701/1 |
| 2012/0262002 A1* | 10/2012 | Widmer et al. | 307/104 |
| 2013/0127409 A1* | 5/2013 | Ichikawa | 320/108 |

FOREIGN PATENT DOCUMENTS

WO     2011/116394     9/2011

* cited by examiner

*Primary Examiner* — Drew A Dunn
*Assistant Examiner* — Jerry D Robbins
(74) *Attorney, Agent, or Firm* — Robert J. Myers

(57) ABSTRACT

A system and a method to provide alignment between a source resonator and a capture resonator. The system and method may be used to align a vehicle having a capture resonator to the source resonator of a wireless inductive battery charging system for an electric vehicle. The system includes a display device, a sensor to determine a location of the source resonator relative to the capture resonator, and a controller in communication with the source resonator, the capture resonator, the sensor, and the display device. The controller is programmed to determine a relative distance and a relative direction between the source resonator and the capture resonator, determine a transfer efficiency of electrical power between the source resonator and the capture resonator. The display device is configured to indicate the relative distance and the relative direction between the source resonator and the capture resonator and indicate the transfer efficiency.

19 Claims, 8 Drawing Sheets

SYSTEM AND METHOD TO ALIGN A SOURCE RESONATOR AND A CAPTURE RESONATOR FOR WIRELESS ELECTRICAL POWER TRANSFER

TECHNICAL FIELD OF INVENTION

The invention generally relates to wireless electrical power transfer between a source resonator and a capture resonator, and more particularly relates to a system and method to align the source resonator to the capture resonator using a graphical display device to maximize power transfer efficiency.

BACKGROUND OF INVENTION

Electric vehicles and electric-hybrid vehicles are gaining in popularity with consumers. The electric motors in these vehicles are typically powered from multiple storage batteries disposed in a battery pack in the vehicle. If the battery needs to be recharged while the vehicle is parked, a wired coupling device is connected to the vehicle, typically by the vehicle operator. However, some operators object to having to 'plug-in' their vehicle each time the vehicle is parked.

Wireless or connector less battery chargers have been proposed, see U.S. Pat. No. 5,498,948 issued Mar. 12, 1996 to Bruni et al. and U.S. Pat. No. 8,008,888 issued Aug. 30, 2011 to Oyobe et al. A known wireless battery charger includes a source resonator or charging pad lying on a parking surface under the vehicle being charged, and a corresponding capture resonator mounted underneath the vehicle. Such wireless battery chargers are most efficient when the vehicle is parked such that the source resonator and capture resonator are horizontally (i.e. laterally and longitudinally) aligned. However, as the source resonator and the capture resonator may be underneath the vehicle and/or out of the vehicle operator's view, it is difficult for the vehicle operator to judge where to park the vehicle so that the source resonator and the capture resonator are aligned.

Some current wireless charging systems rely on methods to align the capture resonator attached to the undercarriage of a vehicle with its corresponding source resonator using trial and error positioning for the vehicle relative to the source resonator. These methods are time intensive, with poor repeatable results. Other wireless charging systems utilize wheel stops to align the capture resonator on the vehicle with the source resonator. While these systems may provide precise alignment for one particular vehicle configuration, they are unlikely to provide adequate alignment for a wide variety of vehicles wherein the spatial relationship between the wheels and capture resonator differ.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY OF THE INVENTION

In accordance with one embodiment of this invention, a system to provide alignment between a source resonator and a capture resonator is provided. The source resonator is coupled to an electrical power source to provide an electric current to the source resonator that causes the source resonator to emit a magnetic charging signal. The capture resonator is configured to wirelessly receive the magnetic charging signal and provide electrical power based on the magnetic charging signal. The system includes a display device, a sensor configured to determine a location of the source resonator relative to the capture resonator, and a controller in communication with the source resonator, the capture resonator, the sensor, and the display device. The controller is configured to determine a relative distance and a relative direction between the source resonator and the capture resonator. The controller is also configured to determine a transfer efficiency of electrical power between the source resonator and the capture resonator. The display device is configured to indicate the relative distance and the relative direction between the source resonator and the capture resonator and indicate the power transfer efficiency based on commands from the controller.

The capture resonator may be disposed on a vehicle that is to be guided into a parked position. The controller may be further configured to determine whether the vehicle is parked. The display device may be configured to indicate an efficiency score based on commands from the controller. The efficiency score may be based on the power transfer efficiency determined when the vehicle is parked. The efficiency score may be graphically represented within a plurality of concentric zones.

The display device may be configured to indicate the location of the source resonator relative to the capture resonator based on commands from the controller, the location being determined at a time the vehicle was parked. The location may be indicated within one of the plurality of concentric zones.

The controller may also be configured to determine a current state of charge for a battery electrically coupled to the capture resonator. The display device may be configured to indicate the current state of charge based on commands from the controller.

The controller may additionally be configured to determine a charging time for the battery based on the current state of charge and the power transfer efficiency and the display device is configured to indicate the charging time based on commands from the controller.

The controller may further be configured to determine whether the efficiency score exceeds a threshold and the display device is configured to indicate a request to reinitiate a parking process when the efficiency score is below the threshold based on commands from the controller.

In another embodiment of the present invention, a method to align a source resonator and a capture resonator is provided. The source resonator is coupled to an electrical power source to provide an electric current to the source resonator that causes the source resonator to emit a magnetic charging signal. The capture resonator is configured to wirelessly receive the magnetic charging signal and provide electrical power based on the magnetic charging signal. The capture resonator is disposed on a vehicle when the vehicle is being guided to a parked position. The method includes the steps of providing a display device and determining a relative distance and a relative direction between the source resonator and the capture resonator. The method further includes the steps of indicating the relative distance and the relative direction between the source resonator and the capture resonator via the display device, determining a power transfer efficiency of electrical power between the source resonator and the capture resonator, and indicating the power transfer efficiency via the display device. The method may also include the steps of determining whether the vehicle is parked and indicating an efficiency score via the display device, wherein the efficiency score is based on the power transfer efficiency determined when the vehicle is parked. The efficiency score may be graphically represented within a plurality of concentric zones.

The method may additionally include the steps of determining a location of the source resonator relative to the capture resonator based on the relative distance and the relative direction between the source resonator and the capture resonator determined at a time the vehicle was parked and indicating the location of the source resonator relative to the capture resonator via the display device, wherein the location is indicated within one of the plurality of concentric zones. The method may include the steps of determining a current state of charge for a battery electrically coupled to the capture resonator and indicating the current state of charge via the display device as well. The method may further include the steps of determining a charging time for the battery based on the current state of charge and the power transfer efficiency; and indicating the charging time via the display device. The method may also include the steps of determining whether the efficiency score exceeds a threshold and indicating a request to reinitiate a parking process via the display device when the efficiency score is below the threshold.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Described herein are a system and a method for aligning a source resonator and a capture resonator, such as those used in an electric vehicle charging system, in order to maximize the efficiency of electrical power transfer between the source resonator and the capture resonator. The source resonator emits a magnetic charging signal that may be amplitude modulated at a resonant frequency of the source resonator and the capture resonator. The charging signal is transmitted to the capture resonator wherein the charging signal induces an electric current. The capture resonator may be attached to a vehicle and the vehicle may be maneuvered to align the source resonator and the capture resonator so that the source resonator and capture resonator are aligned for maximum power transfer efficiency when the vehicle is parked. Because the capture resonator is typically located out of the direct view of a vehicle operator, the system includes a sensor and a controller to determine a relative distance and direction between the capture resonator and the source resonator as the vehicle is parked. The controller also determines the power transfer efficiency as the vehicle is maneuvered into alignment. The relative distance and direction between the source resonator and the capture resonator as well as the determined power transfer efficiency is displayed on a display device that is in a location viable to the operator during the alignment.

Figure 1:
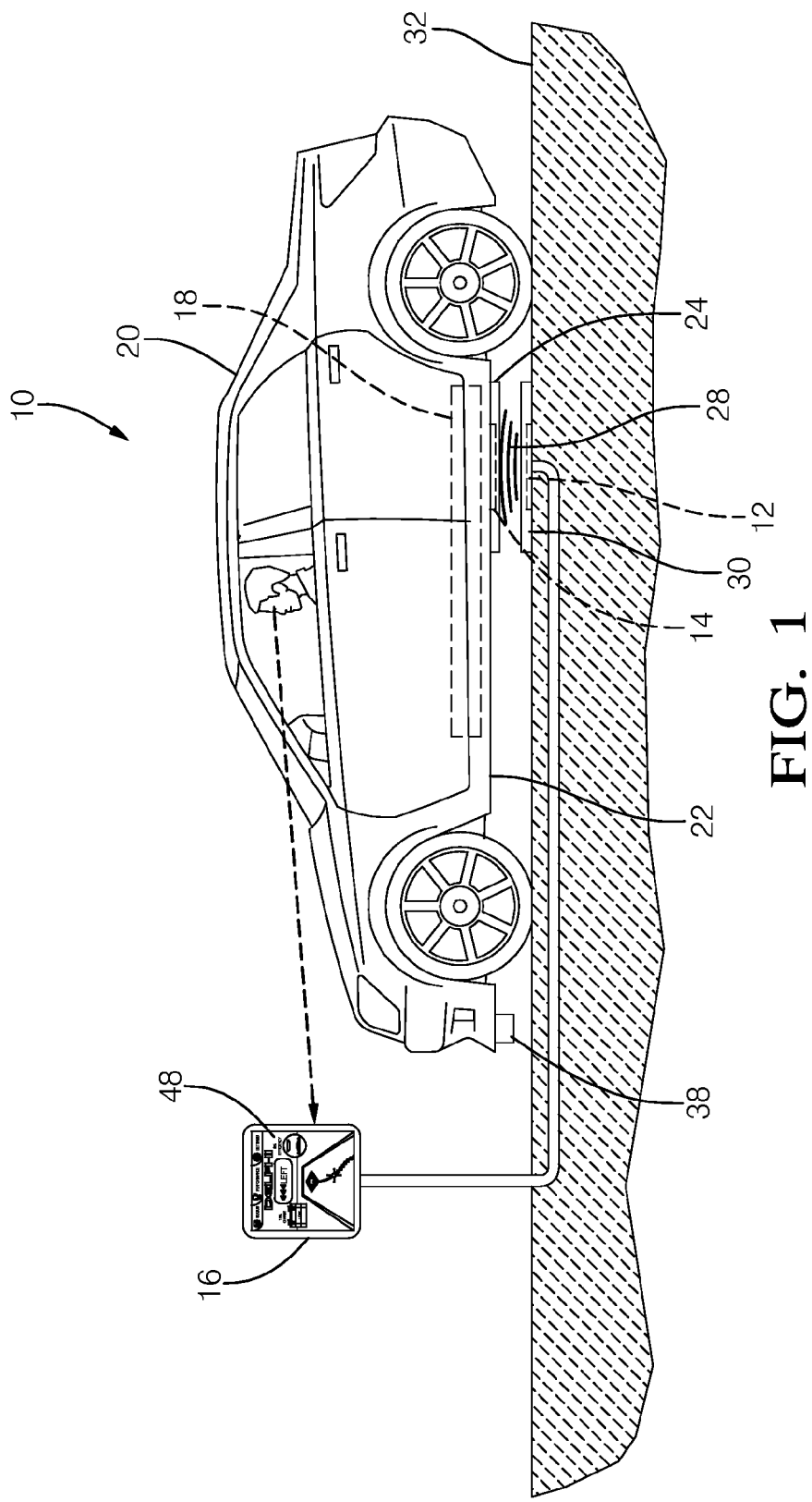
FIG. 1 is a side view of a system to align a source resonator and a capture resonator in accordance with one embodiment.

FIG. 1 illustrates a non-limiting example of a system 10 for aligning a source resonator 12 and a capture resonator 14. The system 10 may be part of a wireless battery charger 16 for charging a battery 18 in a vehicle 20. The system 10 includes the capture resonator 14 that is attached to the vehicle 20. The capture resonator 14 in this non-limiting example is located on the underside 22 of the vehicle 20. Other embodiments may be envisioned in which the capture resonator is located on the front, rear, side, or top of the vehicle. The capture resonator 14 may be packaged inside of a receive pad 24 that is designed to isolate the capture resonator 14 from environmental factors such as dust, dirt, and moisture.

Figure 2:
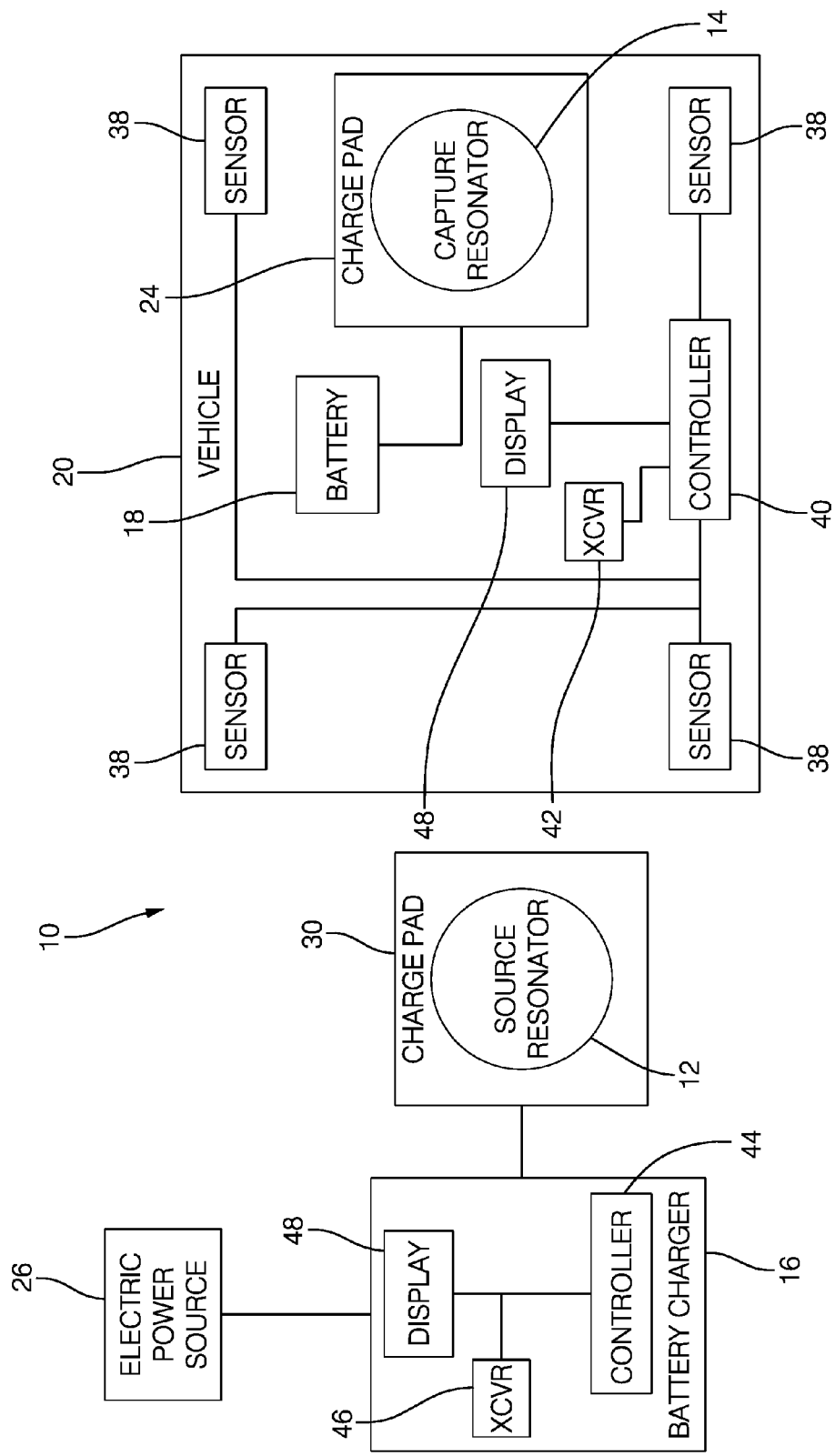
FIG. 2 is a block diagram of the system to align a source resonator and a capture resonator of FIG. 1 in accordance with one embodiment.

As illustrated in the non-limiting example of FIG. 2, the system 10 also includes a source resonator 12 that is coupled to an electrical power source 26 that provides an electric current to the source resonator 12. The source resonator 12 is configured to emit a magnetic charging signal 28 based on the electric current supplied by the power source.

Referring again to FIG. 1, the source resonator 12 may be packaged within a charge pad 30 that is designed to isolate the source resonator 12 from environmental factors such as dust, dirt, and moisture. The charge pad 30 may reside on a parking surface 32 under the vehicle 20 or may be embedded into the parking surface 32 so a top surface of the charge pad 30 is flush with its surrounding parking surface 32. The parking surface 32 may be inside a garage owned by the owner of the vehicle, or may be in a public parking lot that provides electric vehicle recharging services. The capture resonator 14 is configured to wirelessly receive the charging signal and provide electrical power based on the charging signal from the source resonator 12.

Figure 3:
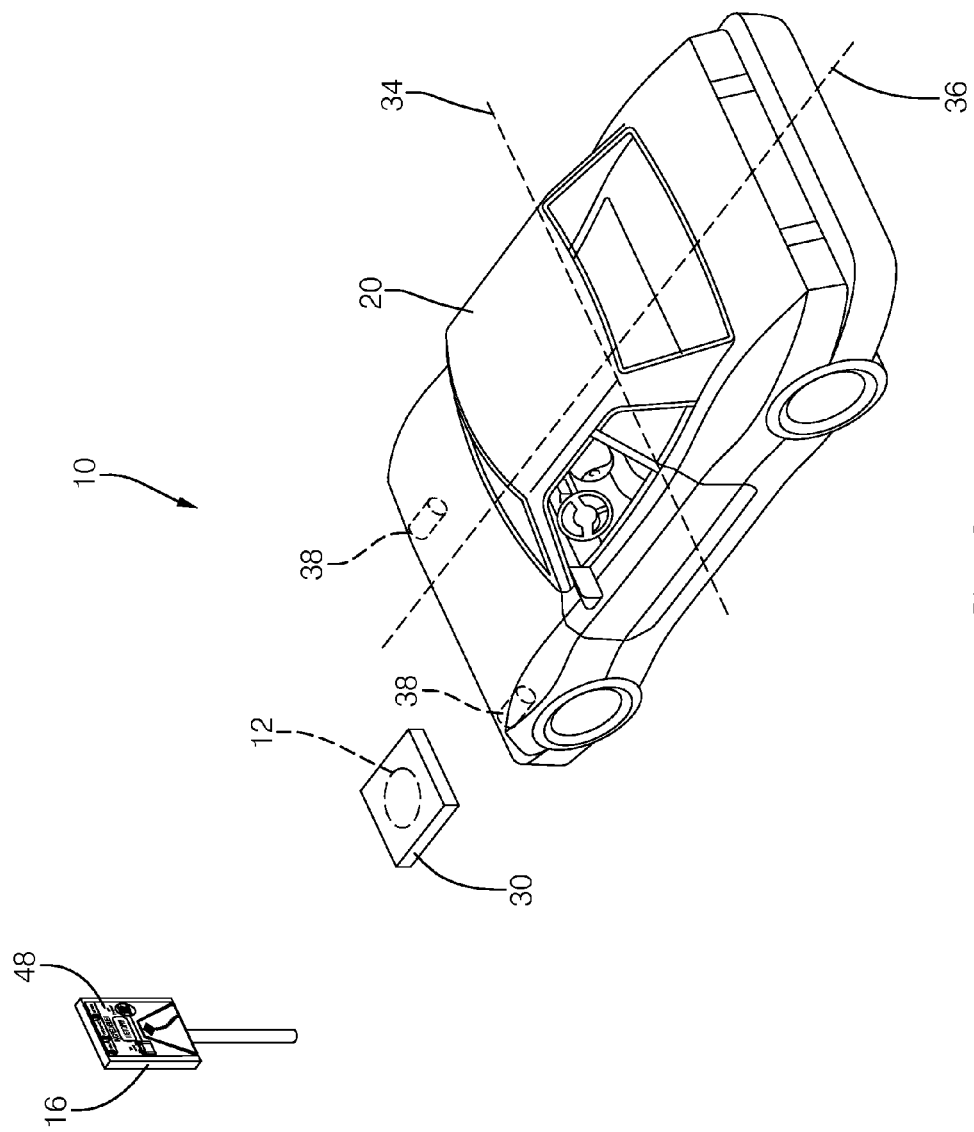
FIG. 3 is a perspective view of the system to align a source resonator and a capture resonator of FIG. 1 being used to park the vehicle in accordance with one embodiment.

It should be appreciated that the more closely the capture resonator 14 is aligned with the source resonator 12, the more efficiently the energy is transferred from the source resonator 12 to the capture resonator 14. Furthermore, it should be appreciated that since the capture resonator 14 and the source resonator 12 may be underneath the vehicle 20, it may be difficult for an operator to maneuver the vehicle 20 to a position where the capture resonator 14 is longitudinally and laterally aligned with source resonator 12. As used herein and illustrated in FIG. 3, a longitudinal direction 34 is along an X axis and a lateral direction 36 is along a Y axis as according to the coordinate system defined by Society of Automotive Engineers (SAE) standard J670. By way of example and not limitation, the vertical separation between the capture resonator 14 and the source resonator 12 is typically about fifteen centimeters to twenty centimeters (15-20 cm).

The system 10 includes a sensor 38 that produces a location signal and, when in communication with a controller 40, is configured to determine a relative distance and a relative direction between the capture resonator 14 and the source resonator 12. The sensor 38 may be a magnetic sensor that is designed to receive a magnetic signal from emitted by the source resonator 12. Alternatively, the sensor 38 may detect an RF signal transmitted by an RF transmitter located within the charge pad 30, as shown in United States Patent Application No. 2012/0095617 published Apr. 19, 2012 by Martin, the entire disclosure of which is hereby incorporated by reference. The sensor 38 may also be an ultrasonic sensor, radar sensor, or imager (visual or infrared) designed to detect the location of the charge pad 30 or source resonator 12. The sensor 38 may include an array of multiple sensors. The array of sensors may include a number of sensors of the same type, such as a group of magnetic sensors. Alternatively, the array may include a combination of sensors of various types, for example a magnetic sensor, and ultrasonic sensor, and an infrared sensor.

As illustrated in FIG. 2, the system 10 further includes a controller 40 in communication with the sensor 38, hereafter referred to as the location controller 40. The location controller 40 is configured to receive the location signal from the sensor 38 and provide an alignment signal that indicates a movement in the lateral direction 36, a movement in the longitudinal direction 34, or combination of the two required of the vehicle 20 to align the source resonator 12 and the capture resonator 14. The location controller 40 may include a processor (not shown) such as a microprocessor or other control circuitry as should be evident to those in the art. The location controller 40 may also include analog to digital convertor circuitry and digital to analog convertor circuitry (not shown) to be able to communicate with the sensor 38 and other sensors or circuitry (not shown) that may be included in the system 10. The location controller 40 may also include memory (not shown), including non-volatile memory, such as electrically erasable programmable read-only memory (EEPROM) for storing one or more routines, thresholds and captured data. The one or more routines may be executed by the processor to perform steps for determining the location of the capture resonator 14 relative to the source resonator 12. The location controller 40 may be further configured to perform the following functions including, but not limited to: calibrating the vehicle make and model to its correlated wireless charger location of the capture resonator 14 mounted to the underside 22 of the vehicle 20, filtering the location signal to deliver a stable and reliable user interface output, performing a system redundancy check to validate the sensor output accuracy, determining the electrical power output by the capture resonator 14, determining the power transfer efficiency between the source resonator 12 and the capture resonator 14, and determining a state of charge of the battery 18. The location controller 40 may be in communication with a radio frequency (RF) transceiver 42 located within the vehicle 20.

Returning now to FIG. 2, the system 10 may include a controller 44, hereafter referred to as the charging controller 44, for controlling the charging signal that determines how much energy is emitted by the source resonator 12. The charging controller 44 may include a processor (not shown) such as a microprocessor or other control circuitry as should be evident to those in the art. The charging controller 44 may also include a RF transceiver 46 able to communicate with the RF transceiver 42 in the vehicle 20 in order to determine a state of charge of the battery 18 and to transmit other information regarding the charging process. The charging controller 44 may also include memory (not shown), including non-volatile memory, such as electrically erasable programmable read-only memory (EEPROM) for storing one or more routines, thresholds and captured data. The one or more routines may be executed by the processor to perform steps for determining if RF signals received by the charging controller 44 indicate that the battery 18 needs charging. The charging controller 44 may also be in communication with sensors (not shown) and may execute routines to determine whether a vehicle 20 is within range of the source resonator 12. The charging controller 44 may also execute routines to control the current sent to the source resonator 12 by the power source. The charging controller 44 may be programmed to command the power source to provide the electric current sufficient for the source resonator 12 to emit the charging signal when a vehicle 20 is detected within proximity of the source resonator 12, that is the vehicle 20 is at a distance less than a distance threshold from the source resonator 12. This distance threshold may be, for example, 1 meter (3.28 feet). The threshold may be selected so that the vehicle blocks exposure to the charging signal. A proximity sensor used to detect a vehicle 20 in proximity to the source resonator 12 may include ultrasonic sensors, magnetic loop sensors, pneumatic sensors (such as those used with a driveway bell), or other proximity sensors well known to those skilled in the art.

The charging controller 44 may be in communication with the location controller 40 via an RF communication link between the RF transceivers 42, 46. The charging controller 44 may send information regarding the electrical power emitted by the source resonator 12 to the location controller 40 via the RF communication link. The location controller 40 may then use the information regarding the electrical power emitted by the source resonator 12 in conjunction with information regarding the electrical power output by the capture resonator 14 to determine a ratio of power transmitted versus power received, hereafter, the power transfer efficiency. The power transfer efficiency may alternately be determined by the location controller 40 by comparing the electrical power output by the capture resonator 14 to an estimate of the electrical power expected to be emitted by the source resonator 12. In this case, a RF communication link between the location controller 40 and the charging controller 44 may not be needed.

Figure 4:
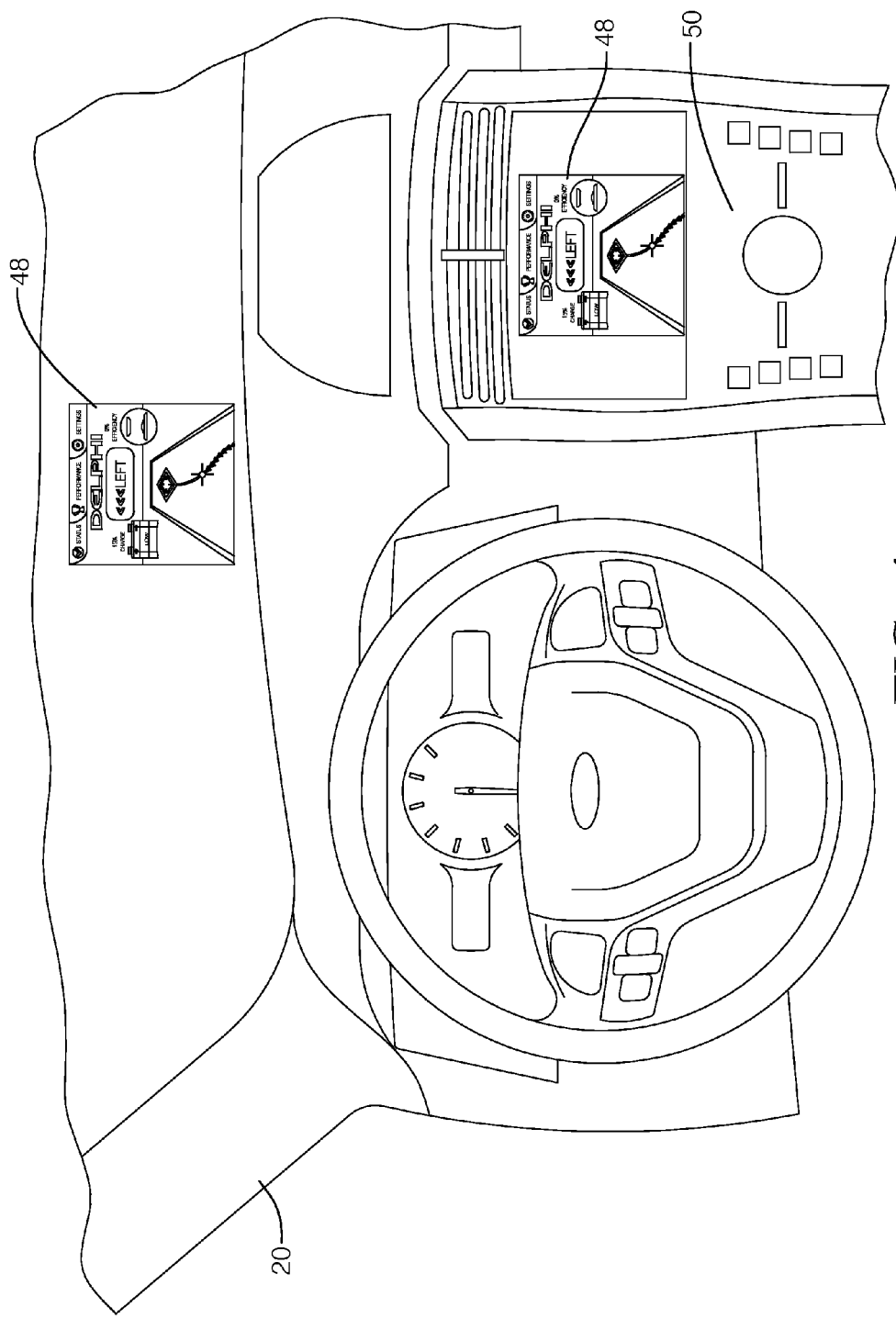
FIG. 4 is a cut-away view of a vehicle interior illustrating alternate locations of a display device in accordance with one embodiment.

The system 10 may further include a display device 48 in communication with the location controller 40. The display device 48 may include a liquid crystal display (LCD), a light emitting diode (LED) display, a plasma display, or any other suitable display. According to the non-limiting examples illustrated in FIG. 4, the display device 48 may be located inside the vehicle 20 in a location visible to a vehicle operator, such as the vehicle center stack 50. The display device 48 may be part of another display system, for example a vehicle navigation display or audio system display. Alternatively, the display device 48 may be located outside of the vehicle 20, perhaps in a location in front of the vehicle 20 that is visible to the operator of the vehicle 20.

Figure 5:
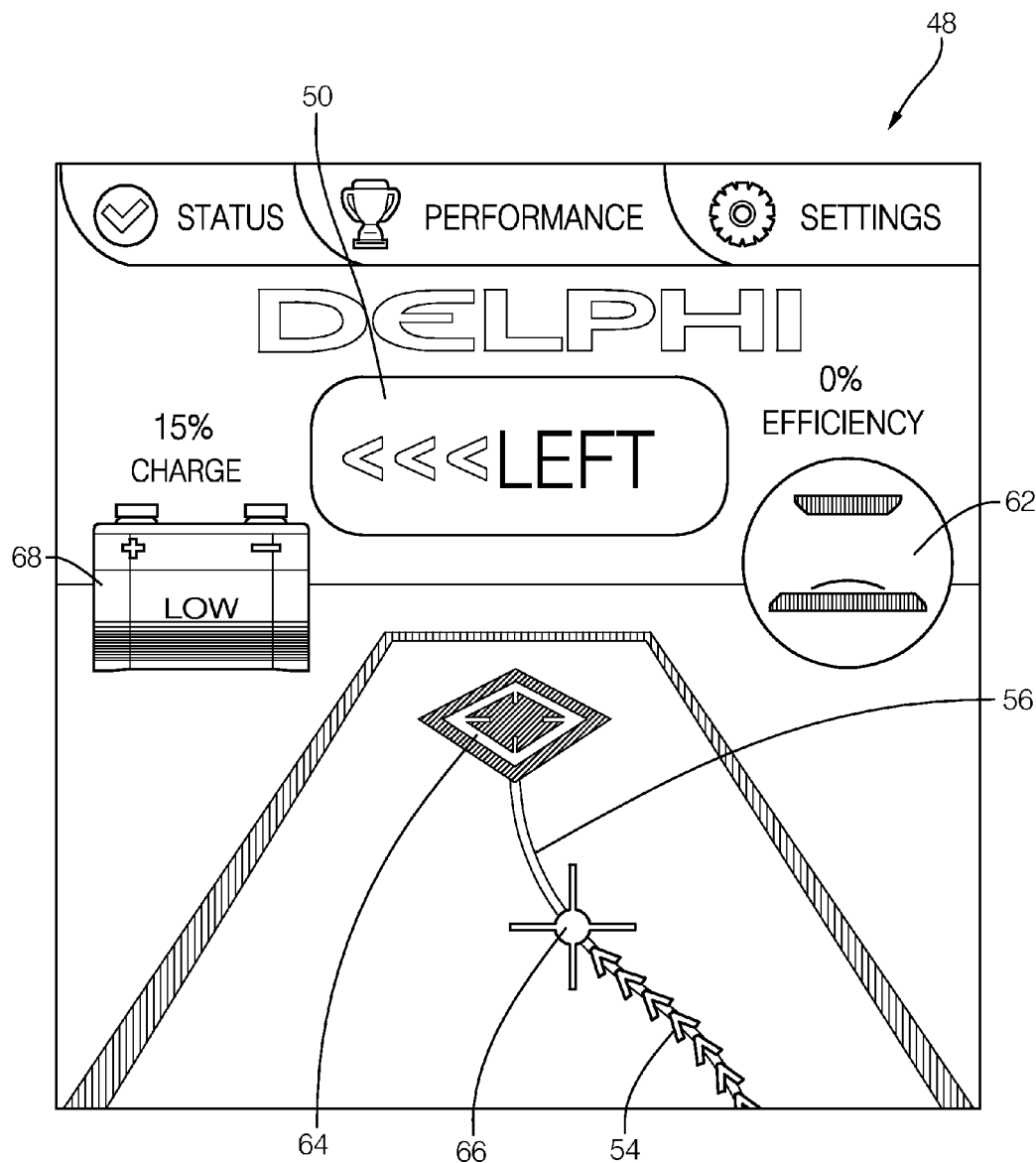
FIG. 5 is a view of indictors displayed on the display device to guide alignment of the source resonator and the capture resonator in accordance with one embodiment.

As illustrated in FIG. 5, the display device 48 may provide a graphic indication of the movement 52 required by the vehicle 20 to align the capture resonator 14 and the source resonator 12. The graphic indication of movement 52 may be based on the alignment signal. The display device 48 may indicate the relative distance and the relative direction between the source resonator 12 and the capture resonator 14. The relative distance and relative direction may be graphically illustrated on the display device 48 by an arrow 54 pointing in the direction from the capture resonator 14 to the source resonator 12 and the length of the arrow 54 may be proportional to the relative distance between the capture resonator 14 and the source resonator 12. The display device 48 may illustrate and maintain an indication of a vehicle track 56 as the capture resonator 14 approaches the source resonator 12.

Figure 6:
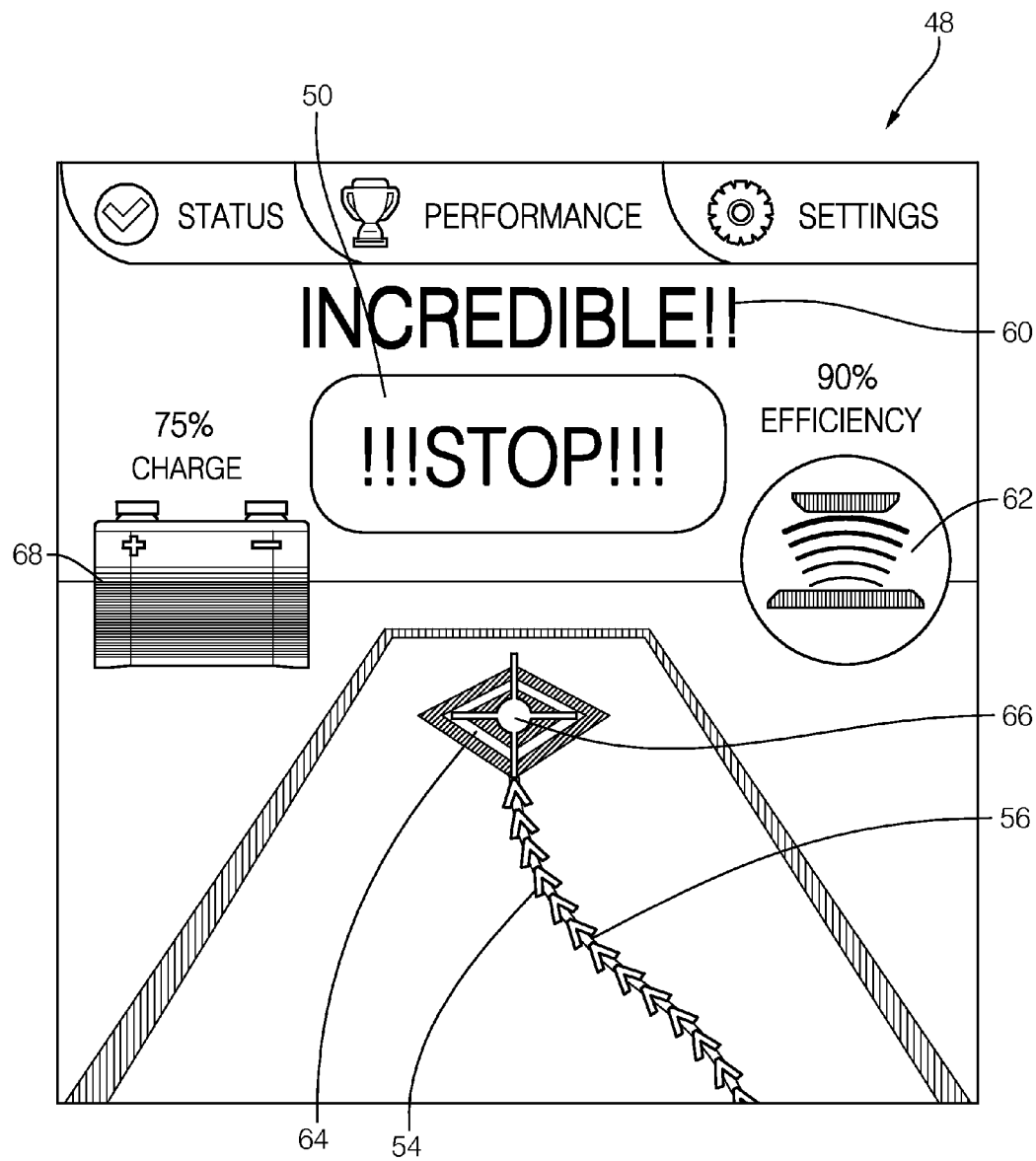
FIG. 6 is a view of indictors displayed on the display device when the vehicle is in a parked position in accordance with one embodiment.

As illustrated in FIG. 6, the display device 48 also indicates the power transfer efficiency between the source resonator 12 and the capture resonator 14. The power transfer efficiency may be illustrated on the display device 48 by a percentage number 58, e.g. 0% to 100%. The percentage number displayed may be the actual power transfer efficiency or it may be a scaled value based on the power transfer efficiency. For example, if the maximum expected power transfer efficiency is 90%, the percentage number may be displayed as 100% when this power transfer efficiency level is reached. The power transfer efficiency may be graphically illustrated by a qualitative indication 60 of power transfer efficiency, such as poor, good, or excellent. A color scheme for providing a qualitative indication, for example red (poor), yellow (good), and green (excellent) may also be used, separately or in conjunction. The power transfer efficiency may be graphically represented on the display device 48 by a series of concentric arcs 62 wherein the height or length of the bar is proportional to the value of the power transfer efficiency. The length or height of the arcs may be determined by a number of elements displayed. The power transfer efficiency may be graphically represented by a series of concentric zones 64, such as a "bulls-eye" target with the highest power transfer efficiency represented by the centermost zone and the lowest power transfer efficiency represented by the outermost zone. The relative location 66 of the capture resonator 14 to the source resonator 12 may be overlaid on the display. The graphic illustrations of power transfer efficiency presented here may be used separately, or in any combination thereof.

The location controller 40 may be in communication with sensors on the vehicle 20, such as a vehicle speed sensor, shift position indicator (commonly known as a PRNDL indicator), or parking brake lever to determine whether the vehicle 20 is parked. The location controller 40 may then determine and record the power transfer efficiency when the vehicle 20 is parked, hereafter referred to as an efficiency score. The location controller 40 may be programmed to command the display device 48 to graphically indicate the efficiency score. The location controller 40 may store the efficiency score in memory and the display device 48 may display past efficiency scores so that the operator may compare them to the current efficiency score. The display may contain a graph that illustrates the current efficiency score in relation to past efficiency scores. It has been observed that comparing the current efficiency score to past efficiency scores may motivate the operator to align the source resonator 12 and the capture resonator 14 to attain a greater power transfer efficiency.

The display device 48 may indicate the location of the source resonator 12 relative to the capture resonator 14. The location may be determined at a time the vehicle 20 was parked. The location may be indicated on the display device 48 within one of the concentric zones 64 described above.

The location controller 40 may be in communication with sensors that are configured to determine a current state of charge 68 of the battery 18 that is electrically coupled to the capture resonator 14. The display device 48 may indicate the current state of charge 68.

The location controller 40 may be programmed to determine a charging time for the battery 18 based on the current state of charge 68 and the current power transfer efficiency. The display device 48 may be configured to graphically indicate the charging time.

The location controller 40 may be programmed to determine whether the efficiency score exceeds a threshold, for example the threshold may be 70%. When the efficiency score is below the threshold, the display device 48 may a display a request to the operator to reinitiate the alignment process.

The source resonator 12 may also emit a magnetic beacon signal. A system for transmitting a magnetic beacon signal via the source resonator 12 is described in U.S. Patent Publication No. 2014/0132207 A1 filed Nov. 15, 2012, the entire disclosure of which is hereby incorporated by reference.

While the embodiments illustrated are applied to a system 10 to align a source resonator 12 with a capture resonator 14 attached to a vehicle 20, this system 10 is not limited to the illustrated application and may be applied to other applications, such as aligning a cellular telephone having a capture resonator 14 with a source resonator 12 within a charging pad.

Figure 7:
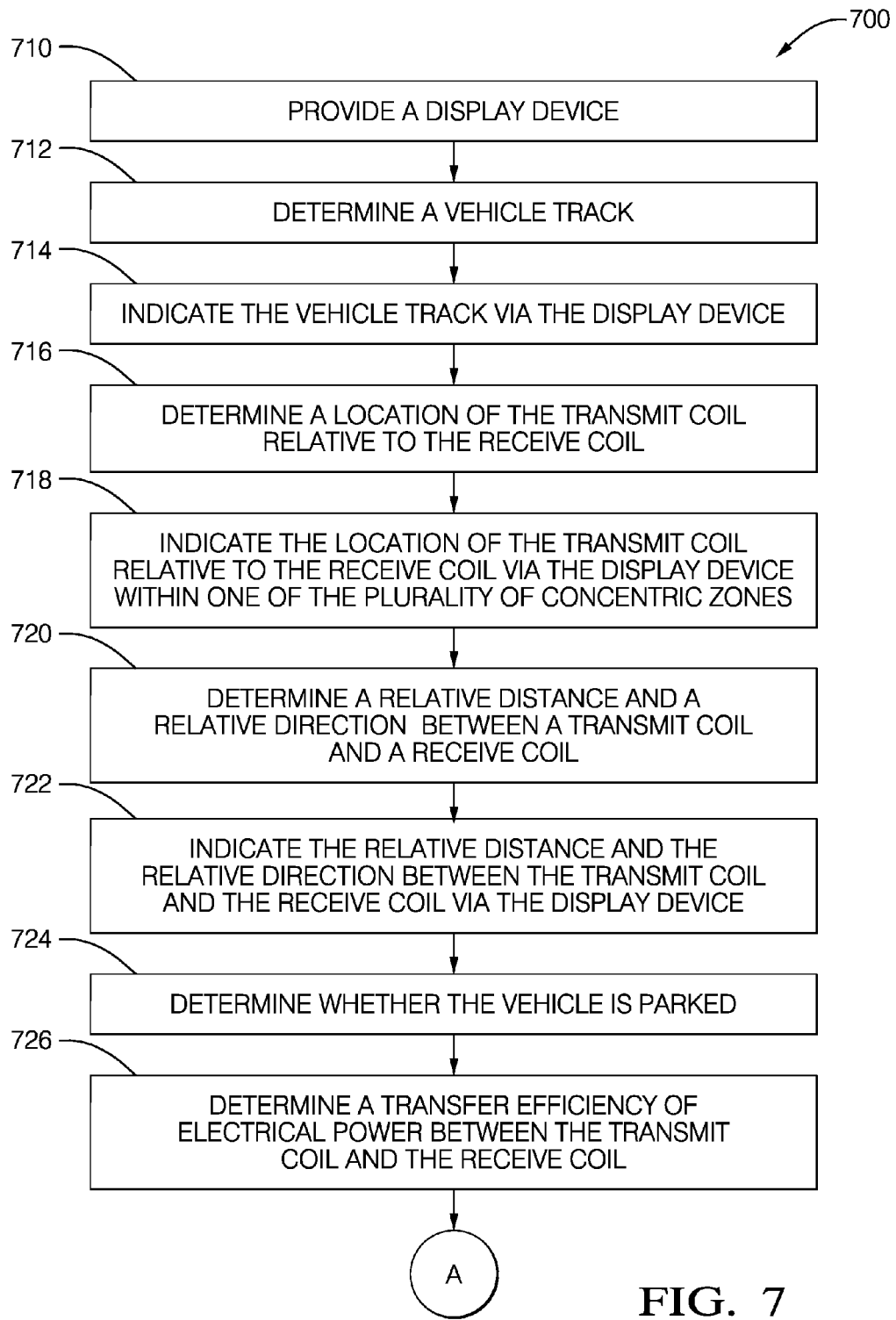
FIG. 7 is a flow chart of a method to align a source resonator and a capture resonator in accordance with one embodiment.
Figure 7:
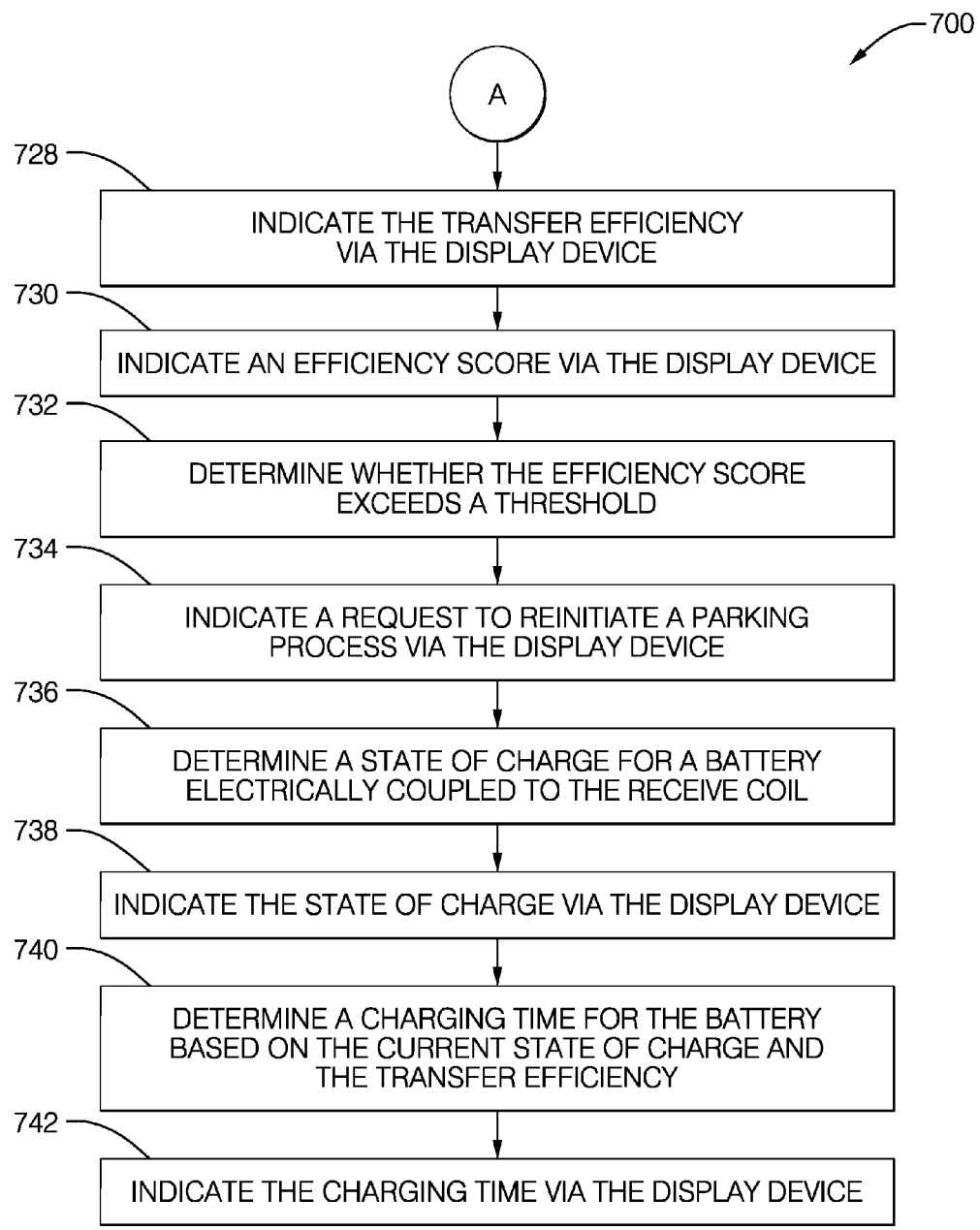

FIG. 7 illustrates a non-limiting method 700 of aligning a source resonator 12 and a capture resonator 14. The source resonator 12 is coupled to an electrical power source 26 to provide an electric current to the source resonator 12 that causes the source resonator 12 to emit a magnetic charging signal 28. The capture resonator 14 is attached on a vehicle 20 when the vehicle 20 is being guided to a parked position. The capture resonator 14 is configured to wirelessly receive the magnetic charging signal 28 and provide electrical power based on the magnetic charging signal 28. The method 700 may include the following steps:

STEP 710, PROVIDE A DISPLAY DEVICE, may include providing a display device 48. The display device 48 may be located within the vehicle 20 in a location in view of a vehicle operator, for example in a vehicle center stack 50. The display device 48 may be incorporated into another vehicle mounted display, such as a navigation or audio system. Alternatively, the display device 48 may be located outside of the vehicle 20 in a location that is visible to the vehicle operator as the vehicle 20 approaches and aligns with the source resonator 12.

STEP 712, DETERMINE A VEHICLE TRACK, may include determining a vehicle track 56 as the capture resonator 14 approaches the source resonator 12.

Step 714, INDICATE THE VEHICLE TRACK VIA THE DISPLAY DEVICE, may include indicating the vehicle track 56 as the capture resonator 14 approaches the source resonator 12 to the vehicle operator via the display device 48 as illustrated in FIGS. 5 and 6.

STEP 716, DETERMINE A LOCATION OF THE SOURCE RESONATOR RELATIVE TO THE CAPTURE RESONATOR, may include determining a location of the source resonator 12 relative to the capture resonator 14. The location may be based on the relative distance and the relative direction between the source resonator 12 and the capture resonator 14 and determined at a time the vehicle 20 was parked.

Step 718, INDICATE THE LOCATION OF THE SOURCE RESONATOR RELATIVE TO THE CAPTURE RESONATOR VIA THE DISPLAY DEVICE, may include indicating the location of the source resonator 12 relative to the capture resonator 14 to the vehicle operator via the display device 48 as illustrated in FIG. 5. The location is indicated within one of the plurality of concentric zones 64.

STEP 720, DETERMINE A RELATIVE DISTANCE AND A RELATIVE DIRECTION BETWEEN THE SOURCE RESONATOR AND THE CAPTURE RESONATOR, may include determining a relative distance and a relative direction between the source resonator 12 and the capture resonator 14.

STEP 722, INDICATE THE RELATIVE DISTANCE AND THE RELATIVE DIRECTION BETWEEN THE SOURCE RESONATOR AND THE CAPTURE RESONATOR VIA THE DISPLAY DEVICE, may include indicating the relative distance and the relative direction between the source resonator 12 and the capture resonator 14 via the display device 48 as illustrated in FIG. 5.

STEP 724, DETERMINE WHETHER THE VEHICLE IS PARKED, may include determining whether the vehicle 20 is parked.

STEP 726, DETERMINE A TRANSFER EFFICIENCY OF ELECTRICAL POWER BETWEEN THE SOURCE RESONATOR AND THE CAPTURE RESONATOR, may include determining a power transfer efficiency of electrical power between the source resonator 12 and the capture resonator 14.

STEP 728, INDICATE THE TRANSFER EFFICIENCY VIA THE DISPLAY DEVICE, may include indicating the power transfer efficiency to the vehicle operator via the display device 48 as illustrated in FIG. 5.

STEP 730, INDICATE AN EFFICIENCY SCORE VIA THE DISPLAY DEVICE, may include indicating an efficiency score to the vehicle operator via the display device 48 as illustrated in FIG. 6. The efficiency score may be based on the power transfer efficiency determined at the time the vehicle 20 is parked. The efficiency score may be graphically represented on the display device 48 within a plurality of concentric zones 64.

STEP 732, DETERMINE WHETHER THE EFFICIENCY SCORE EXCEEDS A THRESHOLD, may include determining whether the efficiency score exceeds a threshold.

STEP 734, INDICATE A REQUEST TO REINITIATE A PARKING PROCESS VIA THE DISPLAY DEVICE, may include indicating a request to the vehicle operator to reinitiate a parking process via the display device when the efficiency score is below the threshold.

Step 736, DETERMINE A STATE OF CHARGE FOR A BATTERY ELECTRICALLY COUPLED TO THE CAPTURE RESONATOR, may include determining a current state of charge 68 for a battery 18 that is electrically coupled to the capture resonator 14.

STEP 738, INDICATE THE STATE OF CHARGE VIA THE DISPLAY DEVICE, may include indicating the current state of charge 68 to a vehicle operator via the display device 48 as illustrated in FIGS. 5 and 6.

STEP 740, DETERMINE A CHARGING TIME FOR THE BATTERY BASED ON THE CURRENT STATE OF CHARGE AND THE TRANSFER EFFICIENCY, may include determining a charging time for the battery 18 based on the current state of charge and the power transfer efficiency.

STEP 742, INDICATE THE CHARGING TIME VIA THE DISPLAY DEVICE, may include indicating the charging time to the vehicle operator via the display device 48.

Accordingly, a system 10 and a method 700 for aligning a source resonator 12 and a capture resonator 14 are provided. The system 10 includes a display device 48 and sensor 38, that in cooperation with a location controller 40 that perform the process of determining a relative distance and a relative direction between the source resonator 12 and the capture resonator 14, determining a power transfer efficiency of electrical power between the source resonator 12 and the capture resonator 14, indicating the relative distance and the relative direction between the source resonator 12 and the capture resonator 14, and indicating the power transfer efficiency. The system 10 and method 700 provide the benefit of providing feedback to a vehicle operator regarding the power transfer efficiency so that the vehicle operator can align the capture resonator and source resonator in order to maximize the power transfer efficiency. Providing past efficiency scores to the vehicle operator for power transfer efficiency may motivate the vehicle operator to improve on past efficiency scores resulting in higher or more efficiency scores.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:

1. A method to align a source resonator and a capture resonator, said source resonator is coupled to an electrical power source to provide an electric current to the source resonator that causes the source resonator to emit a magnetic charging signal, said capture resonator disposed on a vehicle when the vehicle is being guided to a parked position, said capture resonator is configured to wirelessly receive the magnetic charging signal and provide electrical power based on the magnetic charging signal, said method comprising the steps of:
   providing a display device;
   determining a vehicle track as the capture resonator approaches the source resonator;
   illustrating the vehicle track on the display device as the capture resonator approaches the source resonator via the display device; and
   maintaining an indication of the vehicle track on the display device as the capture resonator approaches the source resonator via the display device.

2. The method according to claim 1, wherein said method further includes the steps of:
   determining a relative distance and a relative direction between said source resonator and said capture resonator; and
   indicating the relative distance and the relative direction between said source resonator and said capture resonator via the display device.

3. The method according to claim 1, wherein said method further includes the steps of:
   determining a transfer efficiency of electrical power between said source resonator and said capture resonator; and
   indicating the transfer efficiency via the display device.

4. The method according to claim 3, wherein said method further includes the steps of:
   determining whether the vehicle is parked; and
   indicating an efficiency score via the display device, wherein the efficiency score is based on the transfer efficiency determined when the vehicle is parked.

5. The method according to claim 4, wherein the efficiency score is graphically represented within a plurality of concentric zones.

6. The method according to claim 5, wherein said method further includes the steps of:
   determining a location of said source resonator relative to said capture resonator based on the relative distance and the relative direction between said source resonator and said capture resonator determined at a time the vehicle was parked; and
   indicating the location of said source resonator relative to said capture resonator via the display device, wherein the location is indicated within one of the plurality of concentric zones.

7. The method according to claim 4, wherein said method further includes the steps of:
   determining a current state of charge for a battery electrically coupled to said capture resonator; and
   indicating the current state of charge via the display device.

8. The method according to claim 7, wherein said method further includes the steps of:
- determining a charging time for the battery based on the current state of charge and the transfer efficiency; and
- indicating the charging time via the display device.

9. The method according to claim 4, wherein said method further includes the steps of:
- determining whether the efficiency score exceeds a threshold; and
- indicating a request to reinitiate a parking process via the display device when the efficiency score is below the threshold.

10. A system to provide alignment between a source resonator and a capture resonator, the source resonator is coupled to an electrical power source to provide an electric current to the source resonator that causes the source resonator to emit a magnetic charging signal, the capture resonator is configured to wirelessly receive the magnetic charging signal and provide electrical power based on the magnetic charging signal, said system comprising:
- a display device;
- a sensor configured to determine a location of said source resonator relative to said capture resonator;
- a controller in communication with said source resonator, said capture resonator, the sensor, and the display device, the controller configured to determine a vehicle track as the capture resonator approaches the source resonator, wherein the display device is configured to illustrate the vehicle track as the capture resonator approaches the source resonator and to maintain an indication of the vehicle track as the capture resonator approaches the source resonator via the display device based on commands from the controller.

11. The system according to claim 10, wherein said capture resonator is disposed on a vehicle that is to be guided into a parked position.

12. The system according to claim 10, wherein the controller is configured to determine a relative distance and a relative direction between said source resonator and said capture resonator, wherein the display device is configured to indicate the relative distance and the relative direction between said source based on commands from the controller.

13. The system according to claim 10, wherein the controller is configured to determine a transfer efficiency of electrical power between said source resonator and said capture resonator, wherein the display device is configured to indicate the transfer efficiency based on commands from the controller.

14. The system according to claim 13, wherein the controller is configured to determine whether the vehicle is parked and the display device is configured to indicate an efficiency score based on commands from the controller, wherein the efficiency score is based on the transfer efficiency determined when the vehicle is parked.

15. The system according to claim 14, wherein the efficiency score is graphically represented within a plurality of concentric zones.

16. The system according to claim 15, wherein the display device is configured to indicate the location of said source resonator relative to said capture resonator determined at a time the vehicle was parked based on commands from the controller, wherein the location is indicated within one of the plurality of concentric zones.

17. The system according to claim 14, wherein the controller is configured to determine a current state of charge for a battery electrically coupled to said capture resonator and the display device is configured to indicate the current state of charge based on commands from the controller.

18. The system according to claim 17, wherein the controller is configured to determine a charging time for the battery based on the current state of charge and the transfer efficiency and the display device is configured to indicate the charging time based on commands from the controller.

19. The system according to claim 14, wherein the controller is configured to determine whether the efficiency score exceeds a threshold and the display device is configured to indicate a request to reinitiate a parking process when the efficiency score is below the threshold based on commands from the controller.

* * * * *